Dec. 5, 1944.  A. H. KENT  2,364,149
VECTOR CALCULATING MACHINE
Filed Dec. 11, 1942   2 Sheets-Sheet 2
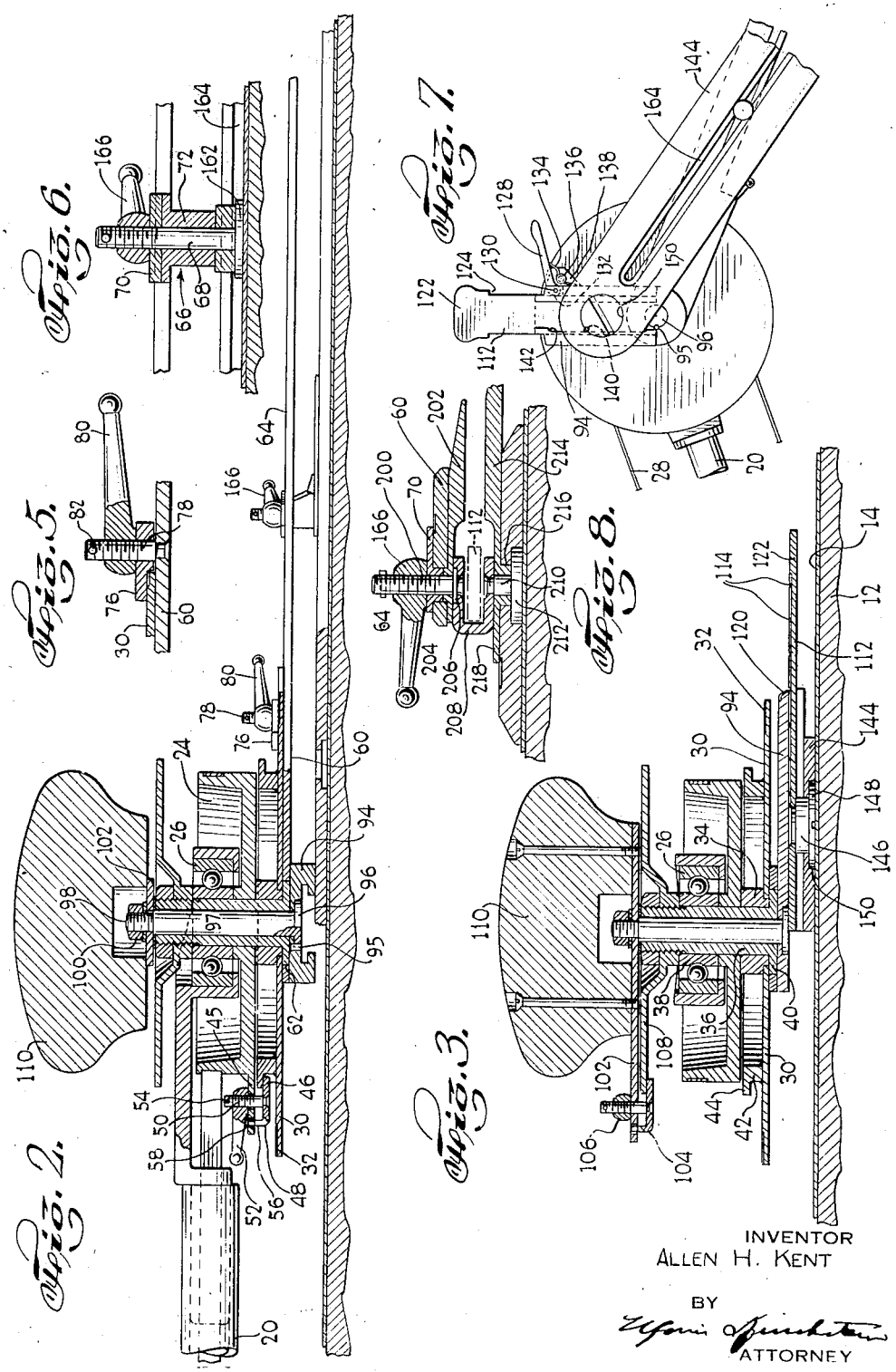
INVENTOR
ALLEN H. KENT
BY
ATTORNEY Patented Dec. 5, 1944

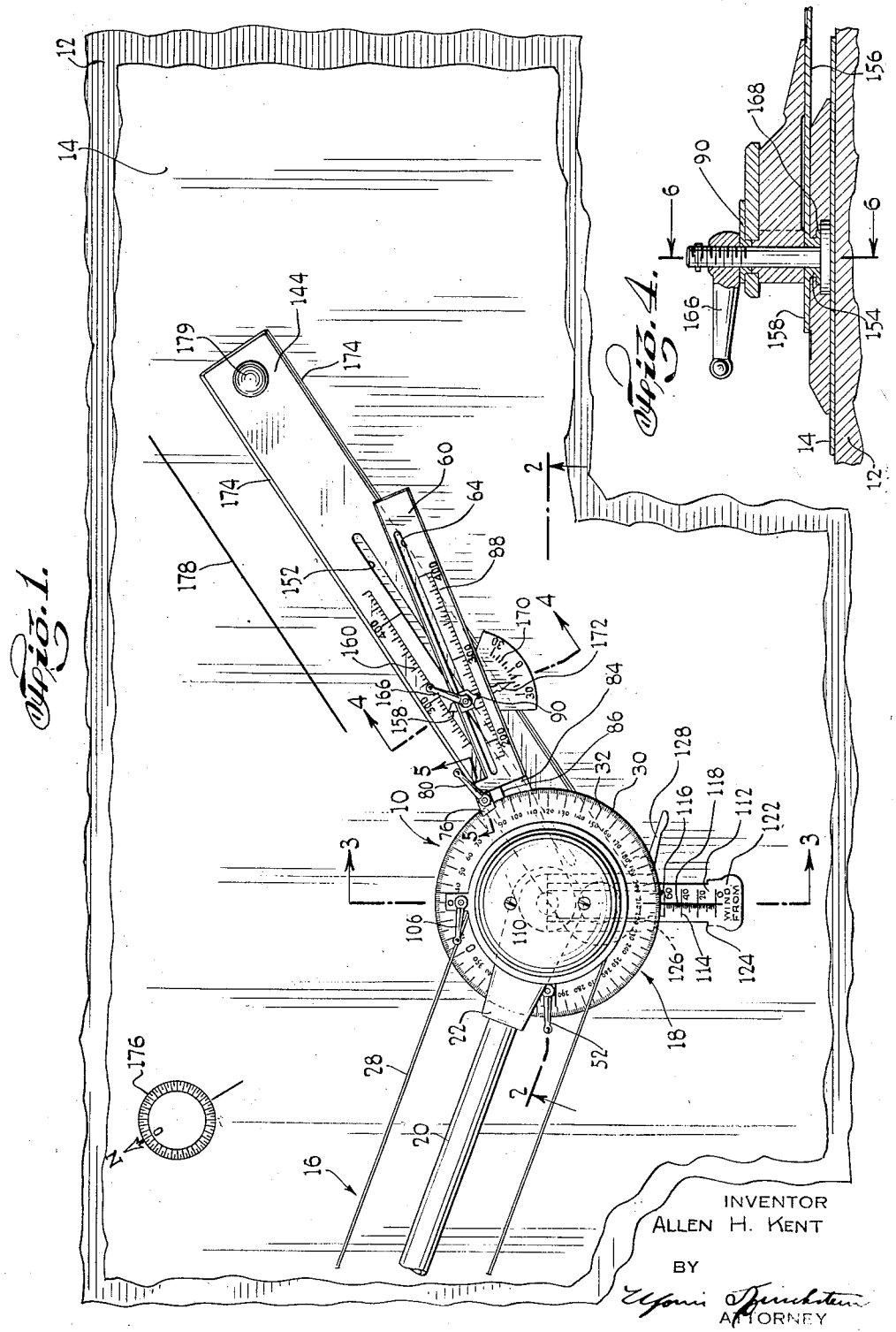

2,364,149

UNITED STATES PATENT OFFICE 2,364,149

VECTOR CALCULATING MACHINE

Allen H. Kent, New York, N. Y., assignor to Vard, Inc., Pasadena, Calif., a corporation of California Application December 11, 1942, Serial No. 468,640

2 Claims. (Cl. 33—102)

This invention relates to a vector calculating machine and more particularly to a machine for computing the true course and speed of a craft such as an airplane or ship which moves in a fluid medium. To simplify the description of the machine it will be hereinafter described with reference only to airplanes, it being understood that the same machine, without any structural alterations, but merely a change of scales, can be employed to solve ship navigation problems.

It is well known that the ground speed of an airplane (hereinafter referred to as "ground speed") is not the same as the air speed of an airplane (hereinafter referred to as "air speed"), but is affected by the direction and speed of the wind. Heretofore, the influence of the wind upon the ground speed and the ground heading of the airplane (hereinafter referred to as the "track") has been trigonometrically calculated or has been determined by plotting vectors on a sheet of paper.

The trigonometrical calculation had the disadvantage of requiring (a) special skill and training on the part of the computer, (b) reference to extended trigonometrical tables, (c) the use of a relatively complicated formula and (d) lengthy calculations. The paper vector-plotting method, on the other hand, was neither rapid nor practical.

It is the object of the present invention to provide a vector calculating mechanism which will compute the effect of the wind upon the ground speed with great accuracy, simplicity and rapidity, and in whose use an operator may be easily trained.

A further object of the invention is to provide a machine of the character described which is adapted to be used in conjunction with a map fixed on a plotting board, which can be readily orientated relative thereto, and which can be employed as a drafting instrument to layout or be placed in coincidence with a line on the map representing the track.

A further object of the invention is to provide a machine of the character described in which all the factors, such as for example, wind, speed, wind direction, ground speed, track, air speed, and air heading of the airplane (hereinafter referred to as "air heading") can be independently set, and which is so constructed that when one or more of these factors are changed, it is not necessary to disturb the setting of the factors which it is desired to hold constant.

An additional object of the invention is to provide a machine of the character described which is economical to manufacture and is rugged in construction and highly efficient in operation.

Other objects of the invention will in part be obvious and in part hereinafter pointed out.

The invention accordingly consists in features of construction, combinations of elements and arrangement of parts which will be exemplified in the constructions hereinafter described and of which the scope of application will be indicated in the claims.

In the accompanying drawings, in which are shown various possible embodiments of this invention, Fig. 1 is a plan view of a machine embodying my invention used with a map;

Figs. 2, 3, 4 and 5 are enlarged detail sectional views taken along the lines 2—2, 3—3, 4—4 and 5—5 respectively of Fig. 1;

Fig. 6 is a sectional view taken along the line 6—6 of Fig. 4;

Fig. 7 is a bottom view of the machine; and

Fig. 8 is a detail view similar to Fig. 4 of a machine embodying a modified form of the invention.

Referring now to the drawings and more particularly to Figs. 1 through Fig. 7, I have there shown a machine 10 embodying my invention. Said machine is particularly adapted to be used on a plotting board 12 on which a map 14 covering the route to be flown is lain.

The machine 10 essentially includes a parallel motion system 16 of any type well known to the art and a computing head 18 especially constructed in accordance with my invention.

The parallel motion system can include a conventional anchor (not shown) which may be in the form of a C-clamp which firmly grasps the plotting board 12. Rotatably mounted on the C-clamp is a lever (not shown) which turns about the center of a pulley (not shown) fixed on the clamp. The other end of the lever carries a second lever 20 and a pair of commonly rotatable pulleys (not shown). One of these pulleys is connected to the fixed pulley by a taut band (not shown). The free end of the lever 20 rigidly supports a fitting 22 which rotatably carries a pulley 24 on a ball bearing journal 26. A tape 28 is stretched over the pulley 24 on one end of the lever 20 and over the second of the pair of commonly rotatable pulleys. As is well known in the art, the parallel motion system just described is such that when the pulley 24 is moved around the board, a line therethrough will be moved parallel to itself. In other words, when the pulley is moved it will not rotate about a vertical axis although the lever 20 will pivot thereabout.

It will be understood, of course, that although I have roughly described a band-type parallel motion system, other parallel motion systems, as for example, rod-type parallel motion systems, can be employed. The rod-type system is more accurate, that is, as its head is moved around the board it will vary from parallelism to lesser degree than does the head in the band-type system. However, the band-type system requires less room for operation since the head of a band-type system can be moved along the edge of the board to which the C-clamp is attached without having the levers extend beyond the board. In the rod-type system it is necessary to allow the levers to project beyond the board in certain positions of the head. This latter drawback is a serious disadvantage when the calculating machine is used in airplanes where space is very limited.

The computing head 18 includes a protractor dial 30 having azimuth graduations 32 imprinted around its periphery. Said dial is rotatably mounted on the head in order that the zero azimuth graduation may be set to parallel north bearing on the map 14 and means is provided to fix the dial in this position so that as the head is moved over the map the zero point will continue to bear true north. To this end the protractor dial 30 is centrally apertured and rotatably received on the reduced end of a bushing 34 (Figs. 2 and 3) fixed to a sleeve 36 force-fitted within the inner race 38 of the ball-bearing journal 26 for the pulley 24. The lower end of the sleeve 36 has a flange 40 extending therefrom and underlying the bottom face of the protractor dial 30 to prevent the dial from shifting axially of the bushing 34. A ring 42 of L-shaped cross-section is rigidly secured to the protractor dial 30, said ring and dial being concentrically arranged. The flange 44 of said ring lies between an ear 45 integral with and extending from the base of the pulley 24 and the horizontal flange 46 of a fitting 48 spaced from and movable vertically relative to said ear. The fitting 48 is mounted on said ear by a bolt 50 whose base is rigidly secured to the fitting and whose shank freely passes through an aperture in said ear. A winged nut 52 (hereinafter referred to as the "azimuth lock") is threaded on the bolt 50, accidental removal thereof being prevented by a taper pin 54 passing through the head of the bolt. A lug 56 integral with the fitting 48 is received in an aperture 58 in the ear 45 so as to maintain the flange 46 in proper position beneath the flange of the ring 42. The fitting 48, bolt 50 and azimuth lock 52 are so dimensioned that when the azimuth lock is loose, the ring flange 44 can be freely turned between the fitting flange 46 and the ear 45. However, when the azimuth lock is tightened, the ring flange 44 will be firmly gripped between the ear 45 and the fitting flange 46 thereby causing protractor dial 30 and pulley 24 to rotate together.

The computing head 18 also includes an air speed vector member. This member comprises an arm 60 having a circular aperture 62 at one end thereof which is snugly received on the circular flange 40 of the sleeve 36. Said air speed arm has an axial slot 64 in which there is disposed a slide 66 (Fig. 6) comprising a pin 68, a marker plate 70 and a pointer block 72, both the plate 70 and block 72 have non-circular portions received in the slot 64 so that, although they may move along the arm 60, they may not rotate relative thereto. Other parts of the slide 66 will be later described in connection with a ground speed vector member.

The arm 60 is provided with means to enable it to be fixed relative to the protractor dial 30. Said means may comprise a block 74 (Fig. 5) having integral lip 76 lying over the face of the protractor dial 30. The block is apertured to receive a bolt 78 whose base is fixed in the air speed arm 60 and whose other end is threaded to receive a winged nut 80 (hereinafter referred to as the "air heading lock"). Bolt 78 is provided with a taper pin 82 to prevent accidental removal of the nut 80. The block 74, lip 76 and nut 78 are so dimensioned that when the air heading lock is loose, the air speed arm may be freely turned about the protractor and that when the air heading lock is tightened the air speed arm is fixed to the protractor. An index plate 84 is secured to the air speed arm 60 and is provided with a marker 86 which in cooperation with the protractor graduations 32 indicates the angular position of said arm relative to the protractor. The arm 60 is further provided with a linear series of graduations 88 which indicate in miles per hour the vector distance from the center of rotation of said arm. The marker plate 70 is provided with a cusp 90 whose position along the graduations 88 indicate the distance of the slide pin 68 from the center of rotation of the air speed arm.

The computing head 18 further includes a wind speed vector member which like the protractor 30 and air speed arm 60 is mounted for rotation about the center on which the pulley 24 turns. Said wind speed vector member comprises an elongated thick plate 94 which is pinned at 95 to the head 96 of a shaft 97 journalled in the sleeve 36. The upper end of the shaft 97 has a reduced threaded portion 98 on which a nut 100 is screwed. Said nut clamps an arm 102 to the shaft 96 for rotation therewith. On the outer end of the arm 102 I mount a fitting 104 similar to the fitting 48. Said fitting 104 is adapted upon tightening of a nut 106 (hereinafter referred to as the "wind direction lock") to clamp the arm 102 to a plate 108 firmly secured to the sleeve 36 which is fixed to the pulley 24. When the wind direction lock 106 is loosened the arm 102 may be turned by means of a knob 110 to vary the angular position of the elongated plate 94 relative to the protractor dial 30.

The bottom surface of the thick plate 94 is longitudinally slotted to receive a plate 112 (hereinafter referred to as the "wind speed slide"). Said slide is imprinted with a plurality of longitudinally spaced graduations 114 which indicate in miles per hour the vector distance of the wind speed slide from the center of rotation of the wind speed slide to a pivot pin hereinafter described for the ground speed vector member.

These graduations are adapted to be read in cooperation with the forward beveled edge 116 of the thick plate 94. The line 118 which these graduations cross is adapted to be read in conjunction with the azimuth graduations 32 on the protractor dial 30 to denote the angular position of the wind speed slide 112 relative to said dial. To facilitate this reading of the angular position of the wind speed slide, the bevelled edge 116 may have a marker 120 imprinted thereon which is permanently in registration with the line 118. The wind speed slide 112 is provided at its projecting end with an enlarged head 122 to facilitate manipulation of the slide. The lateral edges of the slide between the shank portion and head thereof, is abruptly stepped to form shoulders 124 which are adapted to abut setbacks 126 in the forward edge of the plate 94 when the zero marking of the wind speed graduations 114 are directly beneath the bevelled edge 116. The foregoing structure provides a means for mechanically setting the wind speed slide 112 at zero without the necessity of reading the graduations and is of great convenience in using the calculating machine as will later be made clear.

Pursuant to my invention there is also provided means for locking the wind speed slide 112 relative to the thick slotted plate 94. Said means may comprise a lever 128 (hereinafter referred to as the "wind speed lock") pivotally mounted on a pin 130 secured to the plate 94. The wind speed lock 128 has a cam surface 132 which is adapted when said lock is urged in counter-clockwise direction (as viewed from Fig. 7) to be wedged against a lateral edge of the shank portion of the wind speed slide. A torsion spring 134 wound around a bolt 136 secured to an ear 138 integral with the plate 94 serves to bias the wind speed lock 128 to wedging position.

Accidental removal of the wind speed slide 112 from the slotted plate 94 is prevented by a screw 140 fixed to the end of the under surface of the slide 112 adjacent a lateral edge thereof and adapted to ride in a groove 142 at the bottom of said plate 94.

The last main element of the head comprises the ground speed vector member which includes an arm 144 having one apertured end thereof rotatably mounted on the shank of a pin 146 carried on the wind speed slide 112. The head 148 of said pin is received in a countersunk bore 150 in the arm 144 so that the bottom face of said arm may lie flat on the map 14. The center of the pin 146 is so arranged that when the zero graduation on the wind speed slide lies immediately below the beveled edge 116, said pin will be concentric with the pulley 24. In this manner when the wind speed slide is pulled out the readings thereon will be indicative of the vector distance in miles per hour that the center of the pin 146 is spaced from the center of the pulley 24 and from the center about which the air speed arm 60 and wind speed slide 112 rotate.

The ground speed arm 144 is provided with an axial slot 152 in which the depending portion 154 (Fig. 4) of a drift plate 156 is slidingly but non-rotatably accommodated. This plate 156 is apertured to receive the pin 68 of the slide 66 previously mentioned. One portion of the drift plate is provided with a pointer finger 158 in the form of a cusp having a marker which is adapted to be read in conjunction with graduations 160 on the ground speed arm to denote in miles per hour the vector distance of the slide 66 from the center of the pin 146. The lower portion of the pin 68 has an enlarged head 162 which rides in a slot 164 in the under surface of the ground speed arm 144 beneath the groove 152. This slot enables the head 162 of the pin to lie flush with the bottom of the ground speed arm 144 and thus allows this bottom surface to lie flat on the map 14. The other end of the pin 68 is threaded to receive a winged nut 166 (hereinafter referred to as the "air speed lock") which, when tightened, will press the pointer plate 70 carried by the pin 68 against the upper surface of the air speed arm 60 thereby clamping said arm between said plate and the pointer block 72. This tightening of the air speed lock, however, will not clamp the pin 68 to the ground speed arm 144 since the depending portion 154 of said arm riding in the slot 152 of the ground speed arm is provided with flanges 168 which slide in the groove 164.

Means are also provided to indicate the angular amount of wind drift. Said means comprises a plurality of angular graduations 170 imprinted on the drift plate 156 about the center of the pin 68. These angular graduations are read in conjunction with a pointer 172 carried on the block 72. The zero mark of the angular graduations 170 and the pointer 172 are so relatively arranged that when the wind speed slide 112 is set with its zero marking below the beveled edge 116, the pointer 172 is registered with the zero angular marking of the graduations 170.

The foregoing constitute all the essential structural elements of the computing head 18. In order to demonstrate the use thereof I will now proceed to show how said machine may be employed to solve typical problems which arise during the navigation of an airplane. To better appreciate the method employed in working out these problems, it may be mentioned that they are calculated by the use of vector triangles whose three sides include the air speed arm 60, the wind speed slide 112, and the ground speed arm 144, one of whose angles include the drift angle, read on the drift plate 156, and whose three angles can be determined by the wind direction, the air heading, and the track. When any four of these variables are given the remainder may be determined.

The first problem to be considered is the following:

Given wind speed, wind direction, air speed and track, to determine ground speed, air heading and wind drift.

The first operation is to set the zero of the protractor dial to the north meridian on the map at the longitude for which the problem is being calculated. This is accomplished by loosening the wind speed lock 128 and setting the zero graduation on the wind speed slide 112 beneath the beveled edge 116. This will arrange the air speed and ground speed arms 60 and 144 for common rotation about the center of the pulley 24. The air heading lock 80 is then loosened and the two arms 60, 144 rotated about their common centers until the index mark 86 is aligned with the zero azimuth graduation 32. The air heading lock is now locked and the azimuth lock 52 loosened. The computing head is then moved over the map 14 and the ground speed arm turned until one of its linear beveled ruling edges 174 lies on the line indicated true north on the map rose 176 at the longitude for which the problem is being computed. This will cause the zero azimuth graduation to bear true north on the map. The azimuth lock 52 can then be tightened and left alone as long as any problem concerning the navigation of the airplane is being computed at this longitude. The next step is to loosen the wind direction lock 106 and turn the knob 110 until the line 118 on the wind speed slide 112 is aligned with the azimuth graduation 32 corresponding to the direction from which the wind is blowing. In Fig. 1 said knob is set to correspond to a wind blowing from 210 degrees. After the wind direction has been set the wind direction lock 106 is tightened. The operator now loosens the wind speed lock 128, pulls out the wind speed slide until the speed graduation 114 thereon corresponding to the actual wind speed is registered with the beveled edge 116, and then releases the wind speed lock.

The next step is to loosen the air speed lock 166 and slide the plate 70 along the slot 64 until the pointer 90 is in registration with the graduation 88 denoting the air speed in miles per hour. The air speed lock is then tightened and the air heading lock 80 loosened.

With the computing head 18 thus set up the ground speed arm 144 is moved over the surface of the map 14 until a ruling edge 174 lies on a map line 178 denoting the track. A knob 179 on the free end of the arm 144 facilitates manipulation thereof.

The setting of the problem is now complete and the air heading lock can now be tightened and the computing head brought close to the observer in order to read the solution of the problem. The ground speed will be observed by noting the position of the pointer 158 on the scale of ground speed graduations 160. The air heading will be observed by noting the azimuth graduation 32 with which the marker 86 is in registration, and, finally, the angle of wind drift will be observed by noting the graduation 170 on the drift plate 156 with which the point 172 is in registration.

Another typical problem is the following:

Given wind speed, wind direction, air speed, and air heading, to determine ground speed and to determine and plot the tracks.

In the solution of this problem the protractor dial is set with its zero azimuth graduation pointing north on the map and the wind speed and wind direction set into the computing head 18 as described in the first problem. Similarly the pointer 90 is locked at the given air speed. Then the marker 86 is brought into registration with the azimuth graduation for the given air heading and there held by tightening the air heading lock 80. The computing head 18 is now moved over the surface of the map 14 until a linear edge 174 of the ground speed arm lies passes through a point on the map at which the airplane is known to be. A line is then drawn on the map along said edge 174 and through said point. This line denotes the ground track. The computing head can now be brought close to the observer thereof who reads the ground speed and wind drift in the manner set forth in Example 1. To find the track, the observer loosens the air heading lock 80 and the wind speed lock 128, and pushes the wind speed slide 112 down to the zero stop. He then moves the computing head 18 and ground speed arm 144 to register a linear edge 174 with the ground track. He now tightens the air heading lock and reads the azimuth graduation registered with the mark 86. This will give the bearing of the track.

A third typical problem is the following:

Given wind speed, wind direction, ground speed and track, to determine air speed and air heading.

This problem is useful when two separate flight groups are to meet at an appointed spot and time. First the zero azimuth graduation is set to true north for the given longitude and the wind speed and wind direction set into the computing head 18 as explained in the first example. Now a linear edge 174 is placed along the given route and one head used to hold the ground speed arm 144 in this position. With said arm thus held the slide 66 is moved along the groove 152 in the ground speed arm until the pointer 158 is at the given ground speed. The air speed lock 166 and air heading lock 80 are now tightened whereupon the computing head may be brought over to the observer and the air speed and air heading read.

It will be noted that the various elements of the computing head 18 are so arranged that the ground speed and air speed arms can be swung 360 degrees relative to the wind speed slide 112. To accomplish this, the various locks are either disposed on different planes or at different radii from the center of the pulley 24.

However, when the air and ground speed are relatively low and the wind speed relatively high, it will be noted that either the shank or head of the wind speed slide 112 will strike the pointer block 72 and prevent a full 360 degree movement of the ground speed and air speed arms. Where this prevents the machine from solving a problem under any given circumstances, I may slightly modify the construction of the slide 66 to overcome such defect. Said modified construction is shown in Fig. 8 and is generally characterized by the fact that the linear pin 68 of the first form of the invention is replaced by an offset pin. It will be seen, by reference to this figure, that the air speed lock 166 is threaded on a short bolt 200. This bolt freely passes through the marker plate 70 and through a pointer plate 202, which latter, like the plate 70, has a portion 204 non-rotatably and slidably received in the slot 64 of the air speed arm 60. The bolt 200 is provided with a flange 206 underlying the pointer plate 202 so that when the air speed lock 166 is tightened the pointer plate and marker plate will clamp the air speed arm 60 between them. Below the flange 206 the bolt serves as a bearing on which one arm of an offset pin 208 is rotatably mounted. The bolt may be peened over to permanently rotatably secure the pin. The other arm of the pin 208 is rotatably secured to a bolt 210 whose head 212 is slidably received in the groove 164 on the lower surface of the ground speed arm 144. The shank of said bolt 210 is rotatably received in a drift plate 214 having a depending portion 216 non-rotatably and slidably mounted in the slot 152 of the ground speed arm. Said drift plate is provided with the ground speed pointer 218 and angular drift graduations (not shown) similar to those engraved on the drift plate 156. The drift plate 214 and pointer plate 202 are vertically spaced from each other a distance slightly more than the thickness of the wind speed slide 112 to thereby allow said slide to freely pass therebetween to a position in which it is in alignment with the ground speed arm 60. It will be seen that by swinging the offset pin 208 to the right or left the wind direction may be set at or as close as desired to the airplane heading.

It will thus be seen that there is provided a device and method for using the same which achieves the several objects of this invention and which is well adapted to meet the conditions of practical use.

As various possible embodiments might be made of the above invention, and as various changes might be made in the embodiments above set forth, it is to be understood that all matter herein set forth, or shown in the accompanying drawings, is to be interpreted as illustrative and not in a limiting sense.

Having thus described my invention I claim as new and desire to secure by Letters Patent:

1. In a plotting instrument including a pair of interconnected longitudinally slotted arms, a connecting mechanism for pivotally and slidably interconnecting said arms comprising a pivot screw slidably mounted in one of asid slots and extending through the other of said slots, a pointer member encircling said screw and positioned between said arms, said pointer member having formed thereon a key portion received in the slot in one of said members to hold said pointer against pivotal movement relative thereto, a second pointer member encircling said screw above the other of said arms, said second pointer member including a key portion received in the slot in the other of said arms to hold said second pointer against pivotal movement relative to said other arm, and a clamping nut threaded upon said screw and bearing against said second pointer member for locking said pivot screw against sliding movement relative to one of said arms.

2. In a plotting instrument including a pair of interconnected slotted arms, a connection mechanism for slidably and pivotally interconnecting said arms comprising a pivot screw slidably received within the slot in one of said arms, a protractor scale surrounding said screw and positioned between said arms, said protractor scale including a key portion received in the slot in the lower one of said arms to hold said protractor scale against pivotal movement relative thereto, a pointer member encircling said pivot screw and disposed between said arms, said pointer member including a key portion received in the slot in the upper one of said arms to hold said pointer against pivotal movement relative to the upper one of said arms, whereby the position of said pointer on said protractor scale indicates the angular disposition of said arms relative to each other, and clamping means coacting with said pivot screw for locking said pivot screw against sliding movement relative to one of said arms.

ALLEN H. KENT.